Patented Feb. 27, 1945

2,370,195

UNITED STATES PATENT OFFICE 2,370,195

CATALYTIC AGENTS

William E. Ross, Berkeley, Sumner H. McAllister, Lafayette, and John Anderson, Berkeley, Calif., assignors to Shell Development Company, San Francisco, Calif., a corporation of Delaware No Drawing. Application October 31, 1940, Serial No. 363,676

7 Claims. (Cl. 252—228.7)

The present invention relates to improved catalytic agents of the Friedel-Crafts type. More particularly, the invention relates to highly active liquid catalysts comprising an aluminic acid.

As is well known, the most common and effective catalysts of the Friedel-Crafts type are the aluminum halides. Aluminum chloride in particular is inexpensive, possesses excellent catalytic activity and finds application in a wide variety of processes. This catalyst, however, as well as most of the catalysts of this type, is somewhat difficult to employ, particularly in large scale operations. Being a rather volatile high-melting solid material relatively insoluble in most reactants, it is most difficult to secure efficient contact except by the application of excessive quantities. This difficulty in securing sufficient contact is furthermore much more pronounced in the case of aluminum chloride catalysts than with other solid catalysts. This is due to the tendency of aluminum chloride and related catalysts to react with traces of moisture and/or impurities in the reactants and/or traces of products of side reactions to form sticky sludge-like materials. These sticky sludge-like materials are usually insoluble in the reactants. They coat the particles of aluminum chloride and prevent proper contact of the catalyst and reactants. This difficulty is furthermore aggravated by the fact that once the catalyst particles become coated with this sticky sludge-like material, they tend to agglomerate into hard sticky lumps. This difficulty almost precludes the application of this and similar catalysts in a continuous manner. Thus, for example, if it is attempted to continuously pass a slurry of aluminum chloride through a tubular reactor, it is found that the reactor invariably becomes quickly coated and choked with these materials. Although mechanical devices for preventing the accumulation of these products in the reactor have been proposed, they are generally considered inefficient or impractical. The result of this behavior of these catalysts is that excessive amounts of catalyst are employed, the contact is poor, the larger proportion of the catalyst applied is discarded in a practically worthless "sludge" and wasted, and the process is executed in a batch-wise or intermittent manner. In the production of fine chemicals where the cost of the catalyst is usually only a small fraction of the total cost and the operations are carried out in small batches, this inefficient utilization of the catalyst is of relatively little importance. In other cases, however, such as in the catalytic treatment of petroleum fractions where large quantities of inexpensive reactants are treated, it is of prime importance. In these processes, moreover, the prevention of sludge formation and its attendant difficulties are more difficult than in the production of fine chemicals since the petroleum fractions treated invariably contain small to appreciable quantities of hydrocarbon types and impurities which are very susceptible to cracking, polymerization, etc. under the influence of these catalysts.

A primary object of the present invention is to produce catalysts of the Friedel-Crafts type which are unaffected by sludge formation and allow excellent contact to be maintained over protracted periods of time. This is accomplished by providing a liquid catalyst which is substantially immiscible with any oily complexes formed and may be stirred, pumped, etc. to provide almost any desired degree of contact. Another primary object of the invention is to provide catalysts of the Friedel-Crafts type which possess a greater catalytic activity and may be employed at temperatures which are more favorable for such reactions as alkylation of olefines to isoparaffins, the isomerization of saturated hydrocarbons, etc. This is accomplished by providing catalysts comprising particular agents in particular ratios. Further objects of the invention are to provide catalysts of the above type and characteristics which allow full utilization of the catalyst applied and do not require the recovery of catalysts from sludges, and which may be easily and repeatedly reactivated and reused.

In order that certain of the advantages and properties of the catalysts of the present invention may be more easily understood, attention is directed to the fact that in certain cases, although Friedel-Crafts catalysts such as aluminum chloride are employed, these are per se not the active catalysts. It has been found that in certain processes the catalyst is aluminum chloride per se whereas in others it is not aluminum chloride per se but an "aluminic acid," presumably having the formula, $HAlCl_4$, and formed by the reaction of aluminum chloride with hydrogen chloride. These two catalytic agents, namely aluminum chloride per se and the aluminum chloride-hydrogen chloride addition compound (hereinafter referred to as hydrogen aluminum chloride) are to be sharply distinguished since they possess great differences in activity and often catalyze reactions in different directions. The great difference in the actions of these two catalysts, in fact, was the cause of many of the discrepancies and conflicting results obtained by early investigators in this field. The hydrogen aluminum chloride is in general an exceedingly active catalyst and is much more active than aluminum chloride per se. Thus, for example, it is well known that aluminum chloride per se is an energetic catalyst for reactions such as the polymerization of olefines, the cracking of hydrocarbons, and certain condensation reactions between pure hydrocarbons. This catalyst is, however, apparently incapable of catalyzing such reactions as the isomerization of saturated hydrocarbons. On the other hand, the hydrogen aluminum chloride not only acts as a more vigorous catalyst in the above-mentioned reactions, usually causing considerable amounts of side reactions, but it also catalyzes isomerization. It is for this reason that when polymerizing olefines with aluminum chloride the presence of any substantial quantity of hydrogen chloride is undesired, whereas in the isomerization of paraffin hydrocarbons the presence of hydrogen chloride is essential.

The hydrogen aluminum chloride, besides having a greater activity, is also quite different than aluminum chloride per se in its catalytic action. Thus, for example, if benzene is reacted with allyl chloride with aluminum chloride per se as a catalyst, 1,2-diphenylpropane is formed. If, on the other hand, benzene is reacted with allyl chloride in the presence of a substantial amount of hydrogen aluminum chloride as a catalyst the product is not 1,2-diphenylpropane but normal propylbenzene and diethylanthracene.

In view of the vigorous action of the hydrogen aluminum halides and their consequent tendency to cause degradation and other undesirable side reactions, when executing reactions such as polymerization of olefines, etc., which take place easily with any number of catalysts, the formation of hydrogen aluminum halide is undesired and hydrogen halide is not added. In other cases, when executing reactions such as the isomerization of paraffin hydrocarbons which take place only with difficulty and with practically no other catalysts, the formation of hydrogen aluminum halide is caused by deliberate addition of hydrogen halide. The hydrogen halide required to form the hydrogen aluminum halide may be provided by the introduction to the reaction mixture of hydrogen halide per se, or by the addition of agents such as water, alcohols, alkyl halides, etc., which are capable of yielding hydrogen halide under the reaction conditions. However, the hydrogen aluminum halides have a much greater tendency than aluminum halides per se to produce degradation and other side reaction products. Consequently, when hydrogen aluminum halide is present the sludge formation and its attendant difficulties are much more troublesome.

In order to minimize the loss in catalytic activity, loss of aluminum halide, and practical difficulties caused by this formation of "sludge" when effecting reactions in the presence of a hydrogen aluminum halide, it is the practice to retain the concentration of the active hydrogen aluminum halide at a minimum by adding only very small amounts of hydrogen halide. Since the activity of these catalysts is approximately proportional to the concentration of hydrogen aluminum halide and, hence, hydrogen halide present, by employing only very small amounts of hydrogen halide the degradation reactions which contribute largely to the formation of sludge are minimized. This, however, has always been the practice and is no solution to the problem. Also, in attempts to avoid these various practical and engineering difficulties encountered in the use of these catalysts, it has been proposed to employ the aluminum halides in modified forms such, for instance, as the various complex double compounds. Thus, for example, it has been proposed to employ complex compounds of the Ansolvoacid and Gustavson types where the aluminum halides are combined by secondary valence bonds to one or more organic compounds. In these compounds, however, the active hydrogen aluminum chloride can only form by the substitution of hydrogen halide for the combined organic compounds. These complexes are, therefore, of a much lower order of activity and usually require considerably higher reaction temperatures to obtain equivalent conversions. These complexes, moreover, are initially rather viscous liquids which soon increase so much in viscosity that they cannot be properly stirred or pumped. Also, only a small fraction of the aluminum halide employed is utilized catalytically.

Also, it has been proposed in certain cases to employ the aluminum halide in the form of double salts with other metal halides such as the halides of sodium, lithium, potassium, calcium, magnesium, copper, silver, etc. Since the aluminum halides in these double salt compounds are chemically bound with relatively non-volatile salts, they have the advantage of having relatively low vapor pressures. In these double compounds, however, the secondary valences of the aluminum halides are apparently bound even more firmly than in the case of the above-mentioned organic complexes. As a result there is considerable less tendency to form the active hydrogen aluminum halide complexes and these catalysts are even less active. Thus, they will catalyze such simple reactions as polymerization and condensation if sufficiently high temperatures and pressures are employed, but are apparently incapable of catalyzing isomerization of paraffin hydrocarbons, except possibly at very high temperatures. Furthermore, since they generaly melt at quite high temperatures, they are not well suited for application in the liquid state and are usually applied as solids to suitable carrier materials such as pumice or the like.

As will be apparent, the minimization of the "sludge" formation and attendant difficulties has been effected in these cases with a sacrifice in the catalytic activity by directly or indirectly preventing the formation of more than very small quantities of the active hydrogen aluminum halide.

The catalytic agents of the present invention are superior to the promoted aluminum halides per se and those various complex double compounds and double salts thereof in several respects. In the catalytic agents of our invention we do not attempt to curtail or prevent the formation of the active hydrogen aluminum halide compounds, but, on the other hand, provide conditions whereby these active compounds may form and exist to a maximum extent. The catalytic agents of our invention are therefore generally more active than the catalytic agents hitherto employed. They consequently may be employed for a wider range of reactions including the isomerization of paraffins without resort to higher temperatures and pressures where the equilibrium concentrations are less favorable. They are also liquid at quite moderate temperatures and may be circulated and/or stirred as free-flowing liquids in the various processes to obtain a most efficient contact. They are, furthermore, relatively unaffected by any sludge formed and do not change appreciably in viscosity or other physical properties during use. They may, furthermore, be recovered and reused indefinitely with practically no waste of aluminum halide.

The catalytic agents of our invention comprise the active hydrogen aluminum halide compounds in admixture with certain metal salts and are prepared by combining the desired aluminum halide with a molar excess of one or more suitable metal salts and treating the mixture with a hydrogen halide.

While other aluminum halides may be used the preferred aluminum halide is anhydrous aluminum chloride. This material is relatively inexpensive, has a low boiling point, and may be combined with a wider variety of metal salts.

The aluminum halide, according to the present invention, is fused together with a molar excess of a metal salt which does not react therewith. As explained above, many metal halides react with the corresponding aluminum halides to form addition compounds (also called double compounds and coordination compounds) such, for instance, as LiAlCl$_4$ (also written LiCl·AlCl$_3$) in which a pair of electrons of the added compound are shared with the aluminum atom to form a salt of the chlor-aluminic acid (HAlCl$_4$) which, in turn, is analogous to fluoroboric acid (HBF$_4$). (See Lewis, "Valence and Structure of Atoms and Molecules," 1923, page 99.) A typical reaction is as follows:

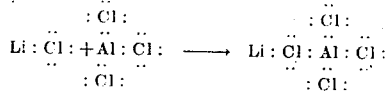

By employing only metal salts (by which term we mean to include mixtures of salts and double salts) which do not react with the aluminum halide, the secondary valence forces of the aluminum halide are preserved for the formation of the desired hydrogen aluminum halide. As a consequence, after treating these mixtures with a hydrogen halide, the catalysts may contain much larger quantities of the active hydrogen aluminum halide compounds than in the catalysts hitherto employed.

Whether or not a given salt reacts with a given aluminum halide to form such an addition or coordination compound can be seen from a melting point-composition diagram of the salt mixture in question. In such cases where reaction takes place, the melting point-composition diagram is characterized by one or more dystectic points (see Millard, "Physical Chemistry for Colleges," 1931, pages 335–339), and in this specification and the following claims the expression "metal salt which does not react with the aluminum halide (or with aluminum chloride)" is intended to refer to salts which do not show such dystectic points.

The melting point-composition diagrams of binary mixtures of the more common metal salts with aluminum chloride and aluminum bromide have been determined. In most cases, therefore, it is known which metal salts react with these aluminum halides and which do not. Thus, such metal salts as the halides of Na, K, Li, NH$_4$, Ag, Cu, Ca, Mg, Ba, etc., are per se unsuited and specifically excluded since they form stable double salts of the type described above with the corresponding aluminum halides. In other cases, such as the sulfates, nitrates, phosphates, and other applicable metal salts of the stronger acids, and in the case of binary, ternary, and quaternary mixtures of metal salts, it is a simple matter to determine their suitability. It will be noted that since the metal salts employed do not react with the aluminum halide employed, their mixture with the aluminum halide will form simple eutectics or mixed crystals which can be easily identified by a simple melting point-composition curve.

In view of the considerable differences in properties between the various aluminum halides, it will be apparent that whether or not a particular metal salt, or mixture of salts, is suitable will depend to a considerable extent upon the particular aluminum halide employed. Thus, for example, antimony trichloride is a preferred metal salt when employed with aluminum chloride. Antimony tribromide, on the other hand, cannot be employed per se with aluminum bromide since it forms a double salt of the formula, AlBr$_3$·SbBr$_3$, therewith. As examples of metal salts which may be employed with one or more of the aluminum halides may be mentioned the halides of As, Zr, Nb, Mo, Pd, Sn, Sb, Ta, W, Tl, Pb, Bi and U. While, in general, any metal salt or mixture of metal salts which does not react with the aluminum halide may be suitably employed, we have found that catalysts prepared with certain metal salts and mixtures of metal salts are much superior to others. Thus, for example, in most cases we prefer to employ metal salts or mixtures of metal salts having normal boiling points below about 300° C. Catalysts prepared with these metal salts or mixtures of metal salts are much more advantageous than catalysts prepared with metal salts having higher normal boiling points in several important respects. For example, catalysts of the present invention prepared from these lower boiling metal salts may be easily recovered and reactivated by a simple distillation treatment, whereas with catalysts prepared from higher boiling metal salts this is practically impossible, and more expensive and inefficient methods must be resorted to. Also, the catalysts prepared from metal salts and mixtures of metal salts boiling below 300° C. usually melt to free-flowing liquids at surprisingly low temperatures and may be applied in the liquid state at desirable low temperatures with much less danger of freezing in the pipes, etc. They are therefore much superior for the execution of certain reactions such as the alkylation of paraffins and/or naphthenes with olefines, the isomerization of saturated hydrocarbons, the reforming of straight run naphthas, etc. Also, of the various available metal salts and mixtures of metal salts we generally prefer to choose those which are less soluble in the reactants and reaction products involved in the particular reaction or process in which the catalyst is to be employed. While this is not essential, it allows the reaction or process to be effected in a more simple and economical manner. Of the various available metal salts, the halide salts of the metals are most generally applicable. It is to be noted, however, that metal halides which act as halogenating agents for the reactants or reaction products involved in the process in which the catalyst is to be employed are generally unsuited. For this reason the halides of the metals in their lower valent states are generally more applicable. The salts of the metalloids and the pseudo halides, in so far as they meet the above-described requirements, may be suitably employed. The term, metal salt, as herein used, is intended to be considered in its more generic sense and to include these compounds. A preferred metal salt which gives exceptionally desirable catalytic agents with the preferred aluminum halide, aluminum chloride, is antimony trichloride. This metal salt, when employed alone or in admixture with other suitable metal salts, yields excellent catalysts which are generally superior in their higher activities, low solubilities in most reactants, low melting points, low boiling points, and high densities.

The metal salts in the catalytic agents of the invention are present in molecular excess, i. e. at least one plus mols, and preferably two or more mols, of metal salts or mixture of metal salts is employed for each mol of free aluminum halide. This is important since if catalysts are prepared having a molar excess of aluminum halide with respect to the other metal salt or mixture of metal salts, they become too vigorous in their action upon being reacted with a hydrogen halide and cause degradation reactions almost exclusively. The exact proportion in any given case will depend upon the melting point and activity desired in the resulting catalyst. In general, it is desirable to employ mixtures corresponding to or approaching the eutectic mixtures. In such cases, however, where the eutectic composition does not contain sufficient free aluminum halide and consequently gives a catalyst of lower-than-desired activity, or contains an excessive amount of free aluminum halide and consequently gives a catalyst of higher-than-desired activity, the composition may be adjusted to yield a catalyst having the desired activity and a slightly higher melting point. Thus, for example, excellent catalysts may be prepared from mixtures comprising from about 76 to 97 mol % antimony trichloride and 24 to 3 mol % aluminum chloride. Those prepared from mixtures containing about 7 mol % free aluminum chloride are of about the optimum activity for most processes and melt to free-flowing liquids at about 70° C. The activity may be increased, however, if desired, by employing mixtures containing more free aluminum chloride, in which case the melting point of the catalyst is increased somewhat.

The catalytic agents of the present invention are prepared from the above-described fused mixtures of metal salts by treating them with a hydrogen halide. This converts free aluminum halide into the active hydrogen aluminum halide. Thus, for example, a fused metal salt mixture, containing about 6% of free aluminum chloride when treated with hydrogen chloride, may react therewith to convert from about 5% to about 40% of the free aluminum chloride to the active hydrogen chloride double compound. The actual ratio of the concentrations of the double compound to the free aluminum halide depends, of course, in each case upon the prevailing temperature. A catalyst employed at about 80° C., for example, may contain about 0.2 mol combined hydrogen chloride per mol of aluminum chloride employed. Also, the metal salts or metal salt mixtures employed with the aluminum halide generally dissolve a considerable amount of hydrogen halide. This tends to increase the effective partial pressure of hydrogen halide in contact with the aluminum halide and favors the formation of the desired active addition compounds. The amount of hydrogen halide dissolved in (or absorbed in) the catalyst depends, of course, upon the partial pressure of hydrogen halide above the catalyst. If, for example, 408 grams of butane containing about 2% HCl is treated with about 400 grams of a catalyst containing 95% $SbCl_3$ at a temperature of about 80° C. and a pressure of about 240 p. s. i., it is found that about 2.46 grams of HCl is absorbed by the catalyst. About 1 gram of the absorbed HCl (or about 40%) is dissolved in the catalyst and may be removed by simple extraction or blowing with nitrogen whereas about 1.44 grams (or about 60%) of the absorbed HCl is combined and is most difficult to remove. Although any of the hydrogen halides may be employed, it is preferable to employ the hydrogen halide corresponding to the aluminum halide employed. Thus, when employing aluminum chloride the preferred hydrogen halide is anhydrous hydrogen chloride. The treatment with hydrogen halide may be effected in any convenient manner such as by bubbling gaseous hydrogen halide through the molten mixture or by agitating the molten mixture in an autoclave under hydrogen halide pressure. Also, the hydrogen halide treatment may be effected by adding a suitable amount of hydrogen halide to the reactants in the process. In this latter method the formation of the necessary hydrogen aluminum halide is considerably slower and the full activity of the catalyst is only reached after operating for some time.

In order to avoid the extraction of the dissolved HCl from the catalyst it is in any case preferable to feed a certain quantity of hydrogen halide, for instance 1% or more, in the feed. When effecting reactions with the present catalysts with liquid reactants, partial pressures of hydrogen halide of from 0.5 to 25 atmospheres, for example, may be advantageously employed.

The present catalysts may be employed for considerable periods of time before their activities decline to an unprofitable point. They do not cause the formation of solid sludge and, unlike the complex aluminum halide addition compounds hitherto proposed, they do not change appreciably in physical properties during use. Thus, an almost complete and most efficient utilization of the applied aluminum halide is possible. The small amounts of tarry materials and spent aluminum halides formed during the process do not contaminate these catalysts but separate as a free-flowing third phase which may be collected and removed from the reaction system either continuously or intermittently in a most simple manner.

When the catalytic activity of the present agents becomes exhausted they may be easily and economically recovered, regenerated, and reused. This may be effected, for example, by allowing the reaction mixture to stratify, separating off the lower catalyst phase and subjecting the same to a distillation. All of the metal salt and most of any unused aluminum halide is recovered overhead leaving a small deposit of coked tars from occluded matter and small quantities of alumina. The small quantities of liquid and gaseous organic products sometimes formed may be recovered separately. Additional amounts of aluminum halide may then be added to the recovered metal salt to give the desired concentration and the mixture again treated with hydrogen halide. In many cases it is found that the distillation step may be dispensed with.

The catalysts of the present invention, since they are liquids and contain an aluminic acid as well as a certain amount of free hydrogen halide, are somewhat more corrosive than most of the catalysts of the Friedel-Crafts type hitherto employed. Corrosion tests, however, have shown that they may be employed without difficulty in apparatus constructed of or lined with aluminum, Monel metal, Silumin, stainless steel and nickel. There are doubtless other materials which may be suitably employed. Such metals as mild steel, cast iron, copper, tin, lead and nickel steel were found to be corroded to a considerable extent. Appreciable corrosion is not only undesirable as regards equipment upkeep but contaminates the catalyst. Thus, for example, if the present catalysts are employed in mild steel equipment, the catalyst becomes contaminated with iron salts which form double salts with the aluminum halide and reduce the activity.

While, as stated above, our catalytic agents are particularly suitable for the catalyzation of hydrocarbon reactions such, in particular, as isomerization, alkylation, etc., it is not to be implied that they are restricted to these uses. They may also be employed in numerous other reactions and are, in general, to be considered as improved substitutes for aluminum chloride, aluminum bromide, and the various catalytically active complexes of these where they are used as true catalysts. Our catalytic agents containing only relatively small amounts of free aluminum halide, however, are obviously not intended to be used in place of aluminum chloride for the cracking of higher boiling hydrocarbons to gasoline since this is not a catalytic process and the consumption of aluminum chloride is at least 5% and as high as 25% of the material treated.

In the claims the expression "major mol proportion" indicates a concentration greater than 50 mol per cent based on the total catalyst. Thus, the salt which does not react with the aluminum halide is always present in a greater mol concentration than any other constituent and in a greater mol concentration than the aluminum halide-hydrogen halide double compound plus any free uncombined aluminum halide which may be present. The term "comprising" is not intended to exclude the presence of minor mol proportions of one or more diluent or promoting materials such, for instance, as the hydrogen halide above that which is combined with the aluminum halide and is dissolved in the catalyst.

We claim as our invention:

1. A catalytic agent of the Friedel-Crafts type consisting of a molten mixture comprising from about 76 to 97 mol per cent of antimony trichloride ($SbCl_3$) and 24 to 3 mol per cent aluminum chloride ($AlCl_3$), said aluminum chloride being partially combined with hydrogen chloride as a complex double compound ($HAlCl_4$).

2. A catalytic agent of the Friedel-Crafts type consisting of a molten mixture comprising aluminum chloride ($AlCl_3$), hydrogen chloride and antimony trichloride ($SbCl_3$), the antimony trichloride being in molecular excess with respect to the aluminum chloride and the hydrogen chloride being largely combined with the aluminum chloride in the form of a complex double compound ($HAlCl_4$).

3. A catalytic agent of the Friedel-Crafts type consisting of a molten mixture comprising an aluminum halide, a metal halide which does not react with the aluminum halide and a hydrogen halide, the metal halide which does not react with the aluminum halide being present in at least two mol proportions with respect to the aluminum halide and the hydrogen halide being largely combined with the aluminum halide in the form of a complex double compound ($HAlHal_4$).

4. A catalytic agent of the Friedel-Crafts type consisting of a molten mixture comprising aluminum chloride ($AlCl_3$), a metal chloride which does not react with aluminum chloride and hydrogen chloride, the metal chloride which does not react with aluminum chloride being in molecular excess with respect to the aluminum chloride and the hydrogen chloride being largely combined with the aluminum chloride in the form of a complex double compound ($HAlCl_4$).

5. A catalytic agent of the Friedel-Crafts type consisting of a molten mixture comprising aluminum chloride ($AlCl_3$), a metal halide which does not react with aluminum chloride and hydrogen chloride, the metal halide which does not react with aluminum chloride being in molecular excess with respect to the aluminum chloride and the hydrogen chloride being largely combined with the aluminum chloride in the form of a complex double compound ($HAlCl_4$).

6. A catalytic agent of the Friedel-Crafts type consisting of a molten mixture comprising an aluminum halide, a metal halide which does not react with the aluminum halide and a hydrogen halide, the metal halide which does not react with the aluminum halide being in molecular excess with respect to the aluminum halide and the hydrogen halide being largely combined with the aluminum halide in the form of a complex double compound ($HAlHal_4$).

7. A catalytic agent of the Friedel-Crafts type consisting of a molten mixture comprising an aluminum halide, a metal halide boiling below 300° C. which does not react with the aluminum halide and a hydrogen halide, the metal halide which does not react with the aluminum halide being in molecular excess with respect to the aluminum halide and the hydrogen halide being largely combined with the aluminum halide in the form of a complex double compound, ($HAlHal_4$).

WILLIAM E. ROSS.
SUMNER H. McALLISTER.
JOHN ANDERSON.